(12) United States Patent
Park et al.

(10) Patent No.: US 8,279,234 B2
(45) Date of Patent: Oct. 2, 2012

(54) METHOD AND SYSTEM OF GENERATING GAMMA DATA OF DISPLAY DEVICE

(75) Inventors: Kyong-Tae Park, Suwon-si (KR); Hyo-Seok Kim, Namyangju-si (KR)

(73) Assignee: Samsung Display Co., Ltd., Yongin (KR)

( * ) Notice: Subject to any disclaimer, the term of this patent is extended or adjusted under 35 U.S.C. 154(b) by 973 days.

(21) Appl. No.: 12/326,718

(22) Filed: Dec. 2, 2008

(65) Prior Publication Data

US 2009/0262114 A1    Oct. 22, 2009

(30) Foreign Application Priority Data

Apr. 16, 2008 (KR) ........................ 10-2008-0035319

(51) Int. Cl.
| | |
|---|---|
| G09G 5/00 | (2006.01) |
| G09G 5/02 | (2006.01) |
| G06K 9/00 | (2006.01) |
| G06K 9/40 | (2006.01) |
| G03F 3/08 | (2006.01) |
| H04N 5/08 | (2006.01) |
| H04N 17/00 | (2006.01) |
| H04N 5/202 | (2006.01) |
| H04N 1/46 | (2006.01) |
| H04N 5/14 | (2006.01) |

(52) U.S. Cl. ........ 345/589; 345/591; 345/604; 345/606; 345/690; 348/179; 348/254; 348/560; 348/674; 358/519; 358/525; 382/167; 382/254; 382/274; 382/293

(58) Field of Classification Search .......... 345/427–428, 345/581, 589–591, 596, 619, 600–604, 606, 345/643, 549, 690, 177–179; 348/253–254, 348/236, 280, 560, 630, 671–674; 358/515–519, 358/504, 525; 382/162–167, 169, 254, 274, 382/293

See application file for complete search history.

(56) References Cited

U.S. PATENT DOCUMENTS

2004/0113875 A1* 6/2004 Miller et al. .................... 345/82
2005/0030305 A1* 2/2005 Brown et al. .................. 345/207
(Continued)

*Primary Examiner* — Wesner Sajous
(74) *Attorney, Agent, or Firm* — H.C. Park & Associates, PLC

(57) ABSTRACT

The present invention relates to a gamma data generation method of a display device. In the method, gamma data including red gamma data, green gamma data, and blue gamma data is determined. A target luminance and a target color coordinate of a first reference gray are determined. Then, an image is displayed on a display device based on red, green, and blue input image signals for a first reference gray, and a first luminance and a first color coordinate from the image are measured. Then, it is determined whether a coordinate difference between the first color coordinate and the target color coordinate and a luminance difference between the first luminance and the target luminance are in an allowable error range or not. The first luminance and the first color coordinate are converted to a first coordinate of a CIE XYZ coordinate system, and the target luminance and the target color coordinate are converted to a target coordinate of the CIE XYZ coordinate system if the coordinate difference and the luminance difference are not in the allowable error range. Finally, the red gamma data, the green gamma data, or the blue gamma data is corrected so that a red luminance, a green luminance, or a blue luminance of the image is changed according to a comparison of the first coordinate of the CIE XYZ coordinate system with the target coordinate of the CIE XYZ coordinate system.

11 Claims, 15 Drawing Sheets

U.S. PATENT DOCUMENTS

| | | | |
|---|---|---|---|
| 2006/0188156 A1* | 8/2006 | Kwak et al. | 382/167 |
| 2007/0285282 A1* | 12/2007 | Nakayama et al. | 340/937 |
| 2007/0285744 A1* | 12/2007 | Boyer et al. | 358/518 |
| 2008/0062161 A1* | 3/2008 | Brown et al. | 345/207 |
| 2008/0094426 A1* | 4/2008 | Kimpe | 345/691 |

* cited by examiner

METHOD AND SYSTEM OF GENERATING GAMMA DATA OF DISPLAY DEVICE

CROSS-REFERENCE TO RELATED APPLICATION

This application claims priority from and the benefit of Korean Patent Application No. 10-2008-0035319, filed on Apr. 16, 2008, which is hereby incorporated by reference for all purposes as if fully set forth herein.

BACKGROUND OF THE INVENTION

1. Field of the Invention

The present invention relates to a method and system of generating gamma data of a display device.

2. Discussion of the Background

In general, an active matrix flat panel display includes a plurality of pixels arranged in a matrix, a thin film transistor (TFT), which is a three terminal element to switch a voltage applied to each pixel, and an electro-optic converting element to convert an electrical signal to light. A display device displays images by controlling the luminance of each pixel, which is output through the electro-optic converting element, according to given luminance information. Each pixel displays one of the primary colors, red (R), green (G), and blue (B), and a color is expressed by a spatial or temporal sum of the primary colors.

Since luminance characteristics are different by gray according to the primary color, it may be difficult to obtain a desired color coordinate according to primary colors when the same electrical signals are applied to pixels to display respective primary colors or the same gray without color distinction. Particularly, organic light emitting materials of pixels displaying different colors are made of different materials in an organic light emitting display. Therefore, different reference gray voltages are given to the pixels for the same gray.

Each display panel may have varying maximum luminances and gamma curves because each display panel may have different TFT characteristics due to a manufacturing process thereof. Therefore, color coordinates may not be uniform.

Lately, a method for correcting a color coordinate by gray after setting up a gamma curve for each color has been developed.

SUMMARY OF THE INVENTION

Additional features of the invention will be set forth in the description which follows, and in part will be apparent from the description, or may be learned by practice of the invention The present invention discloses a method for generating a gamma data of a display device including determining gamma data including red gamma data, green gamma data, and blue gamma data. A target luminance and a target color coordinate of a first reference gray are determined. Then, an image is displayed on a display device based on red, green, and blue input image signals for a first reference gray, and a first luminance and a first color coordinate from the image are measured. Then, it is determined whether a coordinate difference between the first color coordinate and the target color coordinate and a luminance difference between the first luminance and the target luminance are in an allowable error range or not. The first luminance and the first color coordinate are converted to a first coordinate of a CIE XYZ coordinate system, and the target luminance and the target color coordinate are converted to a target coordinate of the CIE XYZ coordinate system if the coordinate difference and the luminance difference are not in the allowable error range. Finally, the red gamma data, the green gamma data, or the blue gamma data is corrected so that a red luminance, green luminance, or a blue luminance of the image is changed according to a comparison of the first coordinate of the CIE XYZ coordinate system with the target coordinate of the CIE XYZ coordinate system.

The present invention also discloses a gamma data generating system of a display device, including a gamma set up unit, a target setup unit, a measuring unit, an error determining unit, a converter, and a comparator. The gamma set up unit sets up a red gamma data, a green gamma data, and a blue gamma data. The target setup unit sets up a target luminance and a target color coordinate of a first reference gray. The measuring unit measures a first luminance and a first color coordinate from an image of the first reference gray, and the error determining unit determines whether a coordinate difference between the first color coordinate and the target color coordinate and a luminance difference between the first luminance and the target luminance are in an allowable error range or not. The converter converts the first luminance and the first color coordinate to a first coordinate of a CIE XYZ coordinate system, and converts the target luminance and the target color coordinate to a target coordinate of the CIE XYZ coordinate system if the coordinate difference and the luminance difference are not in the allowable error range. The comparator changes a red luminance, a green luminance, or a blue luminance of the image according to a comparison of the first coordinate of the CIE XYZ coordinate system with the target coordinate of the CIE XYZ coordinate system.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention

DETAILED DESCRIPTION OF THE ILLUSTRATED EMBODIMENTS

Figure 1:
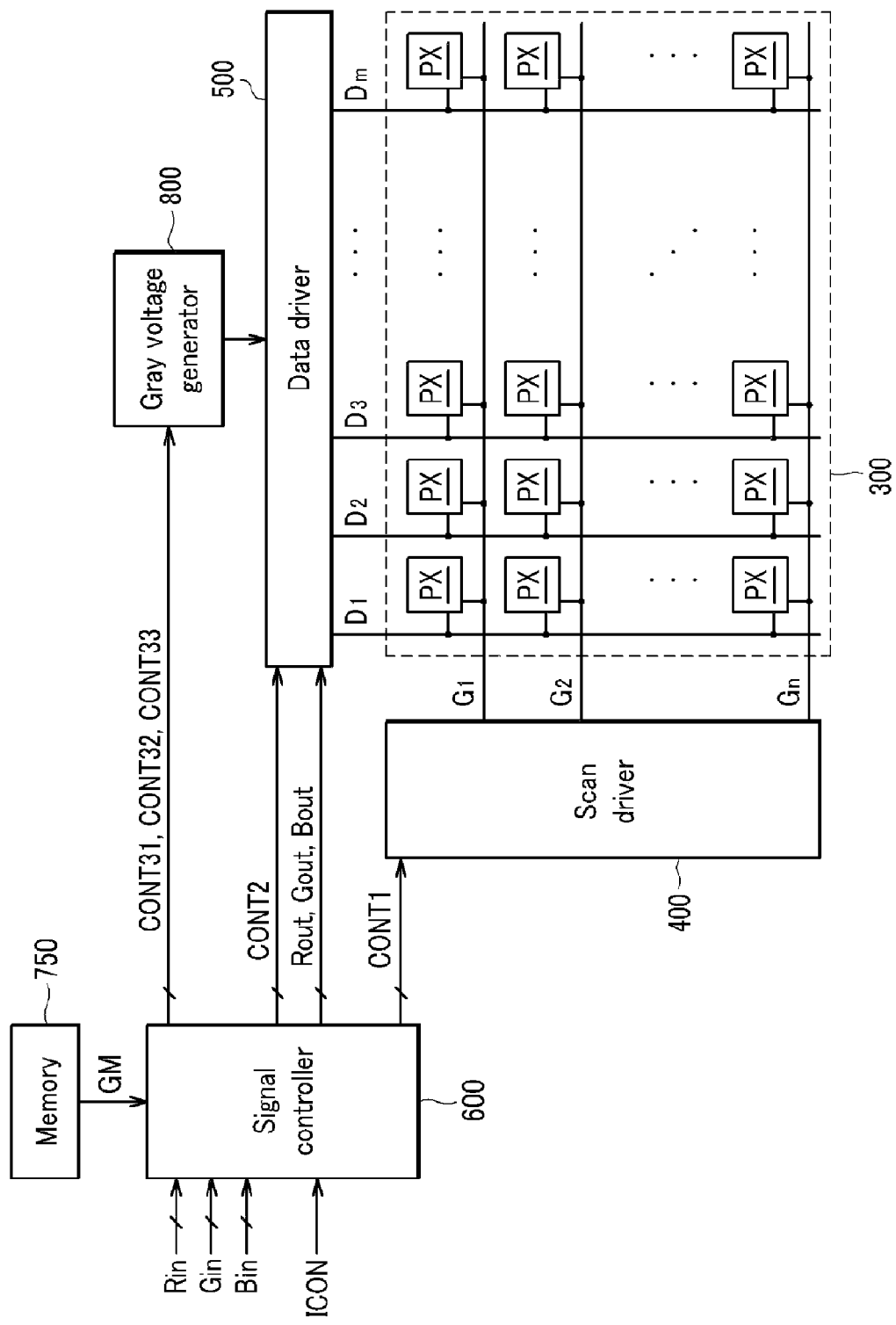
FIG. 1 is a block diagram of a display device according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

Hereinafter, a display device according to an exemplary embodiment of the present invention will be described with reference to FIG. 1, FIG. 2, and FIG. 3.

Figure 2:
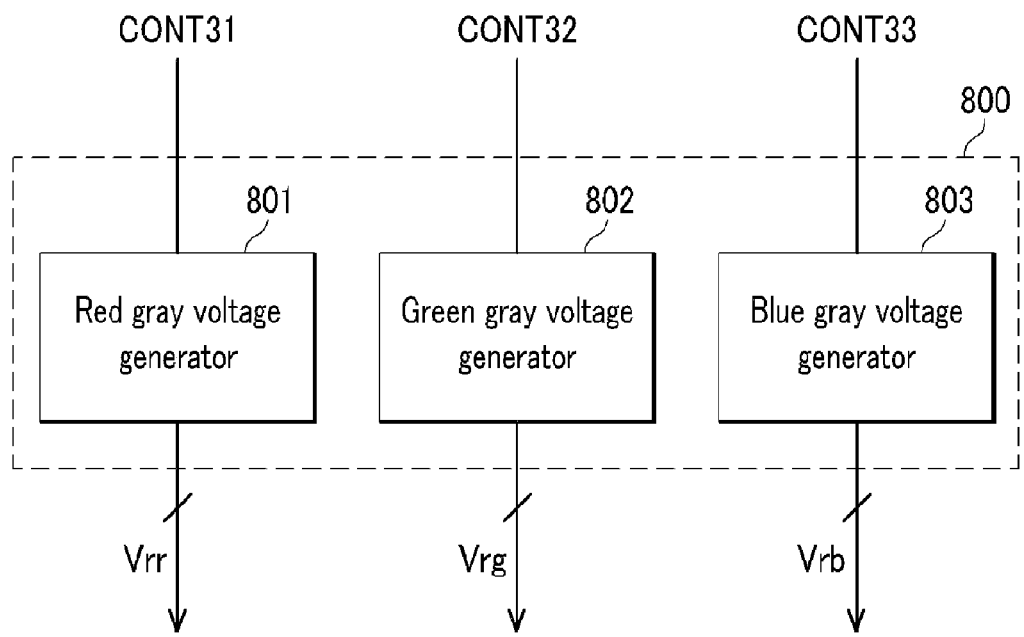
FIG. 2 is a block diagram showing a gray voltage generator of a display device according to an exemplary embodiment of the present invention.
Figure 3:
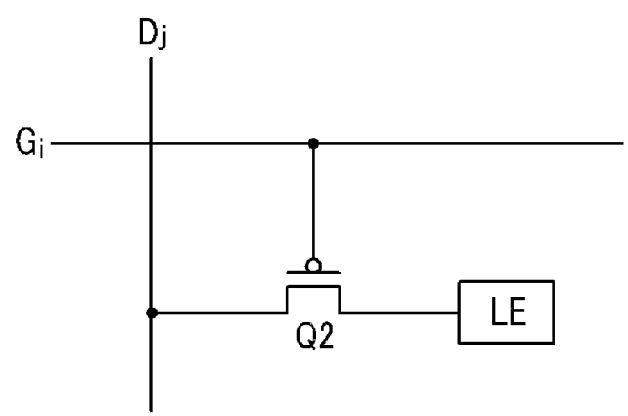
FIG. 3 is an equivalent circuit diagram of a pixel of a display device according to an exemplary embodiment of the present invention.

FIG. 1 is a block diagram of a display device according to an exemplary embodiment of the present invention, FIG. 2 is a block diagram showing a gray voltage generator of a display device according to an exemplary embodiment of the present invention, and FIG. 3 is an equivalent circuit diagram of a pixel of a display device according to an exemplary embodiment of the present invention.

Referring to FIG. 1, a display device according to an exemplary embodiment of the present invention includes a display panel 300, a scan driver 400, a data driver 500, a gray voltage generator 800, a signal controller 600, and a memory 750.

The display panel 300 includes a plurality of display signal lines $G_1$-$G_n$ and $D_1$-$D_m$, and a plurality of pixels PX connected to the display signal lines $G_1$-$G_n$ and $D_1$-$D_m$ and arranged in a matrix.

The display signal lines $G_1$-$G_n$ and $D_1$-$D_m$ include a plurality of scanning signal lines $G_1$-$G_n$ extending substantially in a row direction to transfer a scanning signal, and a plurality of data lines $D_1$-$D_m$ extending substantially in a column direction to transfer a data voltage. The scanning signal lines $G_1$-$G_n$ are substantially parallel to each other, and the data lines $D_1$-$D_m$ are substantially parallel to each other.

Referring to FIG. 3, each pixel PX, for example a pixel PX connected to the $i^{th}$ scanning signal line $G_i$ and the $j^{th}$ data line $D_j$ where i=1, 2, ..., n and j=1, 2, ..., m, includes a switching element Qs and an electro-optic converting element LE.

The switching element Qs is a three terminal element including a control terminal, an input terminal, and an output terminal. The control terminal is connected to the scanning signal line $G_i$, and the input terminal is connected to the data line $D_j$. The output terminal is connected to electro-optic converting element LE. The switching element Qs outputs a data voltage, which is applied to the data line $D_j$, to the electro-optic converting element LE in response to a scanning signal that is applied to the scanning signal line $G_i$.

The electro-optic converting element LE displays images by converting the data voltage to light having luminance that varies according to the magnitude of the data voltage. In the case that display device is a liquid crystal display, a liquid crystal capacitor is an example of the electro-optic converting element LE. In the case of an organic light emitting device, an organic light emitting diode is an example of the electro-optical converting element LE.

In order to display a color, each pixel PX uniquely displays one of the primary colors (spatial division) or alternately displays each of the three primary colors over time (temporal division) so that a desired color is recognized by the spatial or temporal sum of the primary colors. For example, the primary colors may be the three primary colors including red (R), green (G), and blue (B). In the present exemplary embodiment, a color is displayed based on the spatial division, and the pixels PX respectively displaying red, green, and blue color is referred to as red pixels, green pixels, and blue pixels.

The gray voltage generator 800, as shown in FIG. 2, includes a red gray voltage generator 801, a green gray voltage generator 802, and a blue gray voltage generator 803. The red, green, and blue gray voltage generators 801, 802, and 803 generate a plurality of reference gray voltages Vrr, Vrg, and Vrb that are related to luminance of the red, green, and blue pixels PX, and may include a digital-analog converter. The reference gray voltages Vrr, Vrg, and Vrb may include a selected number of gray voltages, e.g., 9 gray voltages, among all gray voltages, e.g., 256 gray voltages. The magnitude of the reference gray voltages Vrr, Vrg, and Vrb may vary.

The scan driver 400 is connected to the scanning signal lines $G_1$-$G_n$ of the display panel 300 and applies scanning signals to the scanning signal lines $G_1$-$G_n$. The scanning signal is a combination of a high voltage and a low voltage.

The data driver 500 is connected to the data lines $D_1$-$D_m$ of the display panel 300. The data driver 500 divides the reference gray voltages from the gray voltage generator 800, generates gray voltages, selects data voltages from the gray voltages, and applies the selected data voltages to the data lines $D_1$-$D_m$.

The signal controller 600 controls operation of the scan driver 400, the data driver 500, and the gray voltage generator 800.

The memory 750 stores gamma data GM, which is information of the magnitude of the reference gray voltages for each of red (R), green (G), and blue (B), in the form of a digital signal and supplies the stored gamma data GM to the signal controller 600. If there are 9 reference grays, the gamma data GM includes information on reference gray voltages for 9 reference grays for each of red (R), green (G), and blue (B). The memory 750 may be an EEPROM.

Hereinafter, operation of the display device according to the present exemplary embodiment will be described in detail.

The signal controller 600 receives input image signals Rin, Gin, and Bin and an input control signal ICON to control the display based on the received input image signals from an external graphics controller (not shown). The input image signals Rin, Gin, and Bin include luminance information of each pixel PX, and the luminance information has a specific number of grays, for example 1,024 ($=2^{10}$), 256 ($=2^8$), or 64

($=2^6$) grays. For example, the input control signals ICON may include a vertical synchronization signal, a horizontal synchronization signal, a main clock signal, and a data enable signal.

The signal controller 600 generates output image signals Rout, Gout, and Bout by processing the received input image signals Rin, Gin, and Bin to be suitable to the structure of the display panel 300 and the operating conditions based on the input image signals Rin, Gin, and Bin and the input control signals ICON, and generates scan control signals CONT1 and data control signals CONT2. The signal controller 600 outputs the scan control signals CONT1 to the scan driver 400, and outputs the data control signals CONT2 and the output image signals Rout, Gout, and Bout to the data driver 500.

The signal controller 600 also reads the gamma data GM from the memory 750, generates gray control signals CONT31, CONT32, and CONT33 by processing the gamma data GM, and outputs the generated gray control signals CONT31, CONT32, and CONT33 to the gray voltage generator 800.

The red, green, and blue gray voltage generators 801, 802, and 803 of the gray voltage generator 800 generate red, green, and blue reference gray voltages Vrr, Vrg, and Vrb having a magnitude that is determined according to the gray voltage control signals CONT31, CONT32, and CONT33, respectively, from the signal controller 600. The generated red, green, and blue reference gray voltages Vrr, Vrg, and Vrb are provided to the data driver 500.

In accordance with the data control signals CONT2 from the signal controller 600, the data driver 500 also receives output image signals Rout, Gout, and Bout for pixels PX in a row. The data driver 500 divides the reference gray voltages Vrr, Vrg, and Vrb, generates gray voltages, and selects data voltages corresponding to the output image signals Rout, Gout, and Bout, thereby converting the digital image signals Rout, Gout, and Bout to analog data voltages. Then, the data driver 500 applies the analog data voltages to the data lines $D_1$-$D_m$.

The scan driver 400 applies scanning signals to the scanning signal lines $G_1$-$G_n$ according to the scan control signals CONT1 from the signal controller 600 so as to apply the data voltages to the pixels PX.

The voltage applied to each pixel PX is converted to light of the corresponding gray through the electro-optic converting element LE, thereby displaying an image on the display panel 300.

As described above, luminance of a pixel PX is determined by the magnitude of the data voltage, and the magnitude of the data voltage is determined by the magnitude of the reference gray voltage. The magnitude of the reference gray voltage is determined by gray voltage control signals CONT31, CONT32, and CONT33 generated by the signal controller 600, and the gray voltage control signals CONT31, CONT32, and CONT33 are determined by the gamma data GM stored in the memory 750. The gamma data GM is previously set up in accordance with the characteristics of the display panel 300 such that the luminance and the color coordinate of an image displayed by a display device is near the desired value, that is, the target luminance and the target color coordinate.

The target luminance and the target color coordinate may be determined using white as a reference. For example, if the white gray is 100, all of a red pixel, a green pixel, and a blue pixel display luminance corresponding to 100 gray. However, since it may be a very complicated and difficult process to set up target luminances and target color coordinates for all grays and then adjust them, such a process is performed only for reference grays corresponding to the reference gray voltages Vrr, Vrg, and Vrb generated by the gray voltage generator 800.

For example, the target luminance and the target color coordinate may be determined by an international standard. As an example, Table 1 shows target luminances for 9 reference grays and target color coordinates of a 1931 chromaticity diagram of the Commission Internationale de l'Eclairage (CIE) when the gamma is 2.2 and 256 grays from 0 to 255 are provided.

TABLE 1

| Reference gray | Target luminance (=luminance of gamma 2.2) | Target color coordinate |
|---|---|---|
| 255 | ML | (0.29, 0.30) |
| 239 | ML * $(239/255)^{2.2}$ | (0.29, 0.30) |
| 223 | ML * $(2239/255)^{2.2}$ | (0.29, 0.30) |
| 191 | ML * $(191/255)^{2.2}$ | (0.29, 0.30) |
| 159 | ML * $(159/255)^{2.2}$ | (0.29, 0.30) |
| 95 | ML * $(95/255)^{2.2}$ | (0.29, 0.30) |
| 63 | ML * $(63/255)^{2.2}$ | (0.29, 0.30) |
| 31 | ML * $(31/255)^{2.2}$ | (0.29, 0.30) |
| 0 | 0 | None |

In Table 1, ML denotes the maximum luminance that the display panel 300 can display.

The gamma value, the entire number of grays, and the number of reference grays may vary from Table 1.

In Table 1, if the reference gray is 191, all of red, green, and blue pixels receive data voltages corresponding to 191 gray and emits light of the corresponding luminance. The sum of the light emitted from the three pixels is white. The target luminance denotes a value that the luminance of the white light must have, and the target color coordinate denotes the color coordinate of the white light.

Hereinafter, a method for generating gamma data GM that is to be stored in the memory 750 will be described with reference to FIG. 4, FIG. 5, FIG. 6A, and FIG. 6B.

Figure 4:
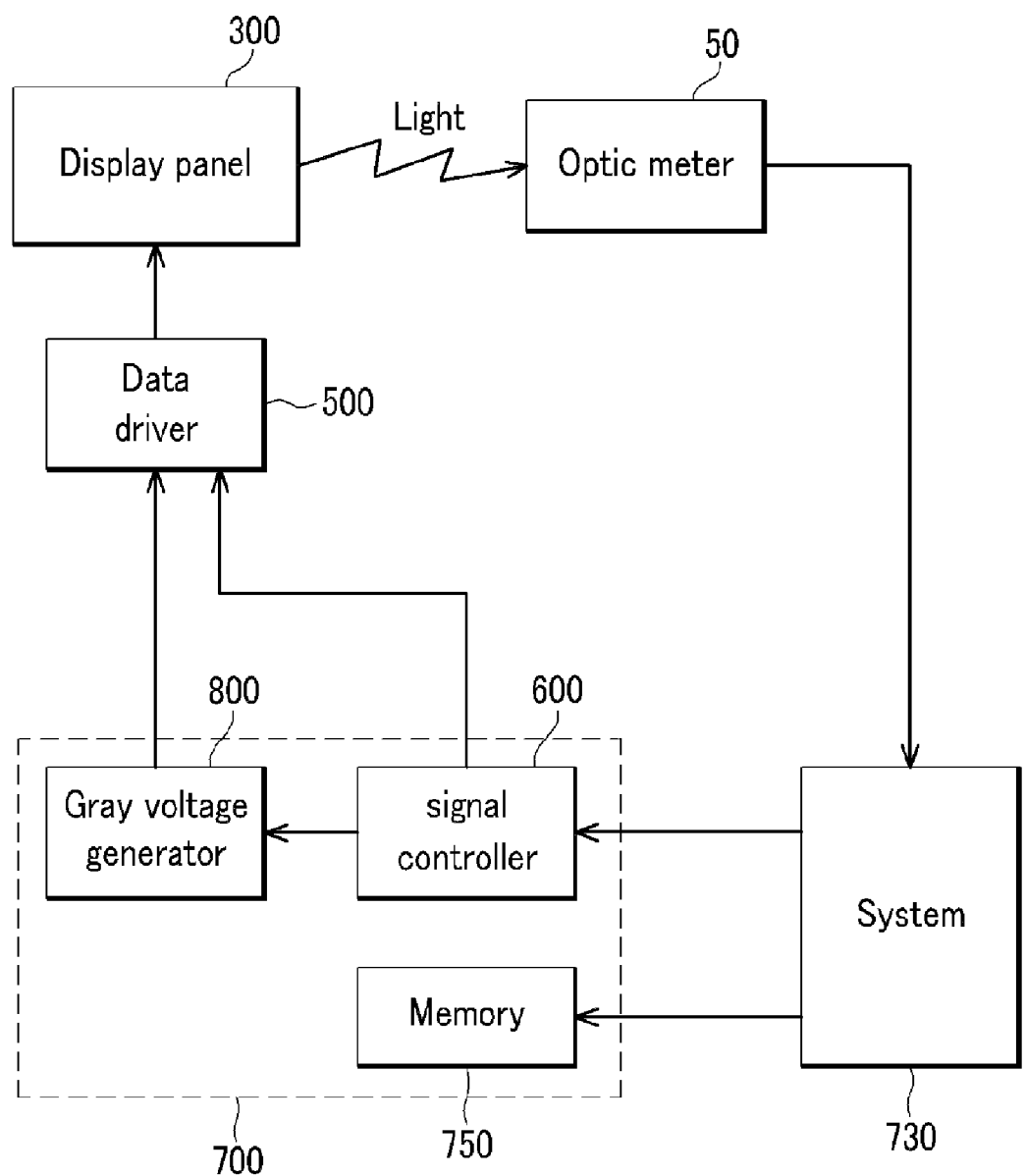
FIG. 4 is a block diagram showing a method for generating gamma data of a display device according to an exemplary embodiment of the present invention.
Figure 5:
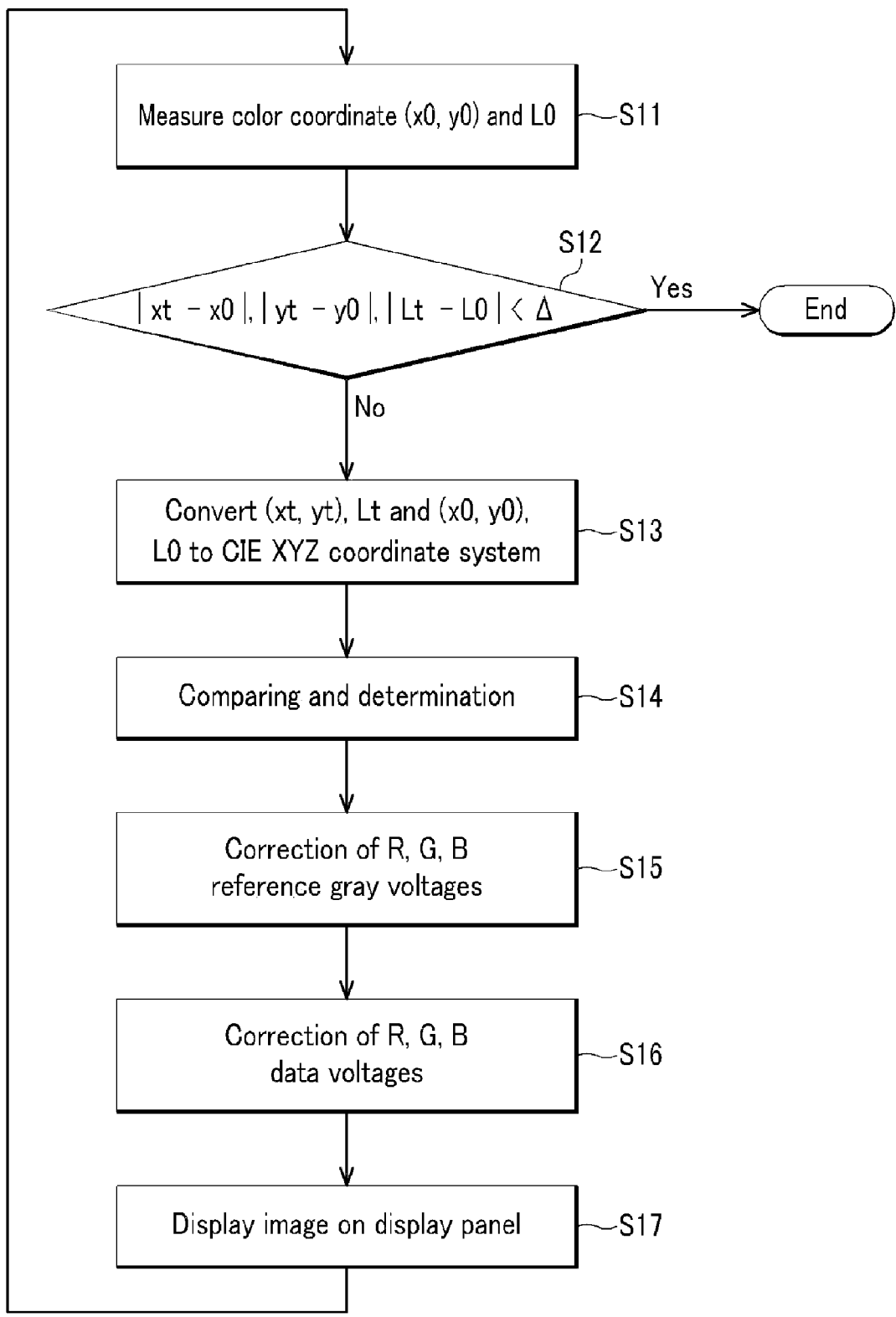
FIG. 5, FIG. 6A, and FIG. 6B are flowcharts of a method of generating gamma data of a display device according to an exemplary embodiment of the present invention.
Figure 6A:
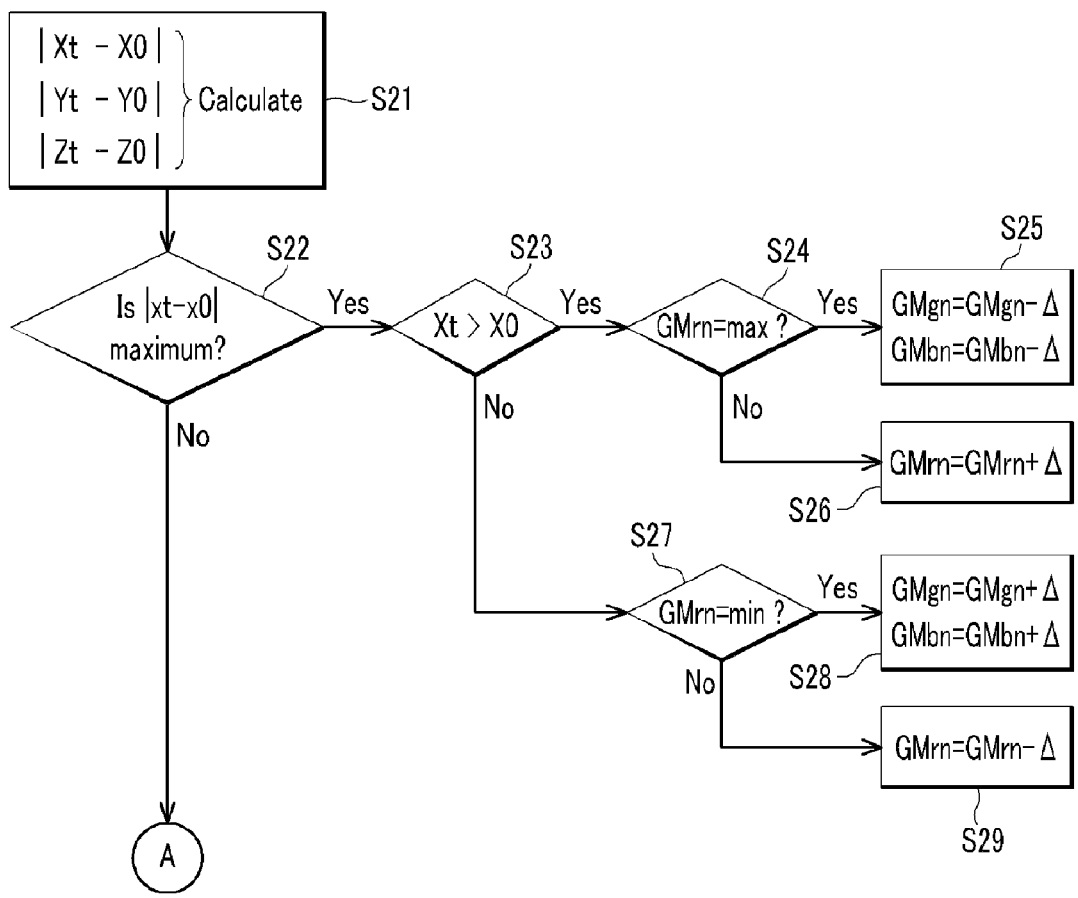
Figure 6B:
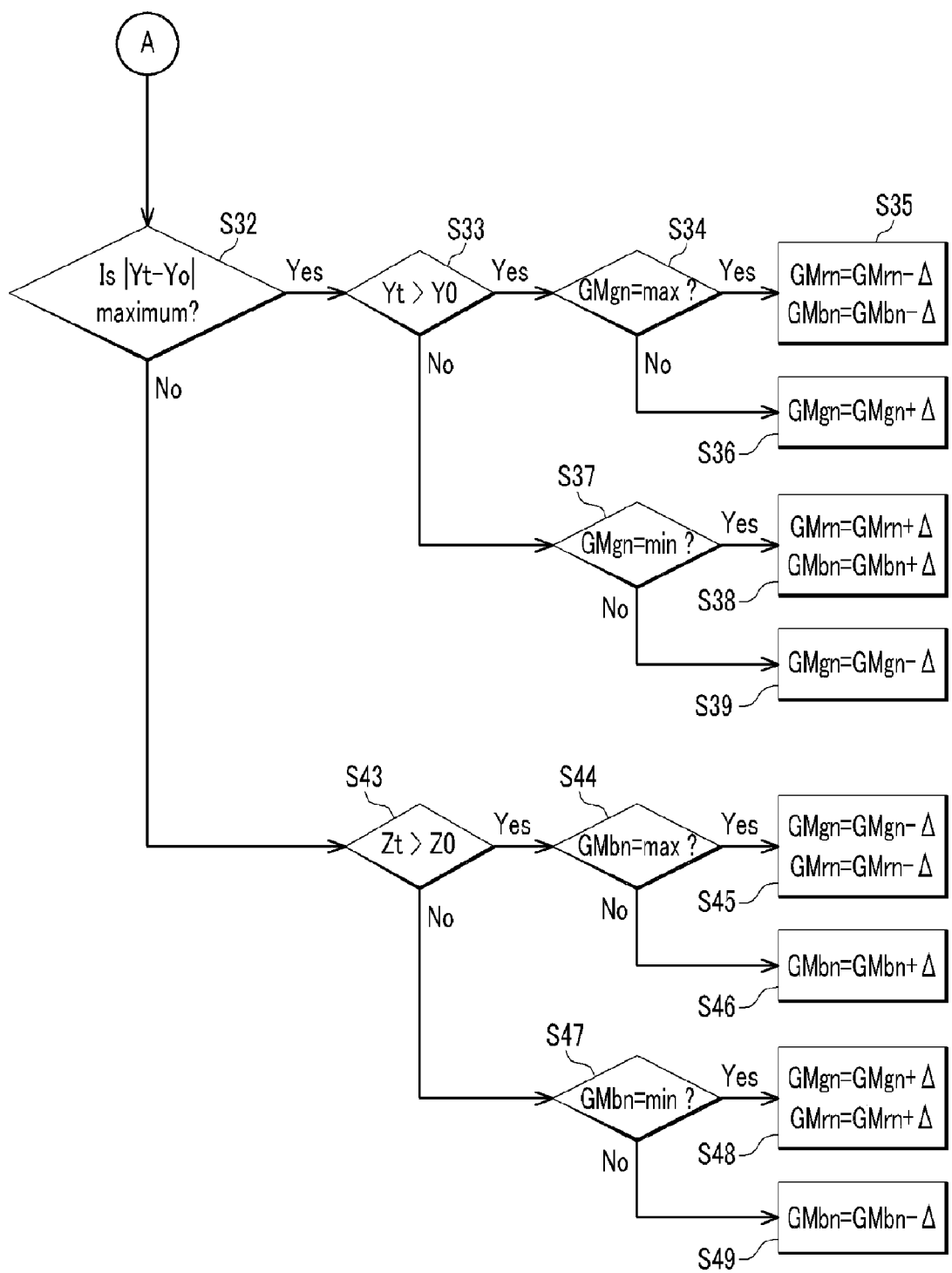
Figure 7A:
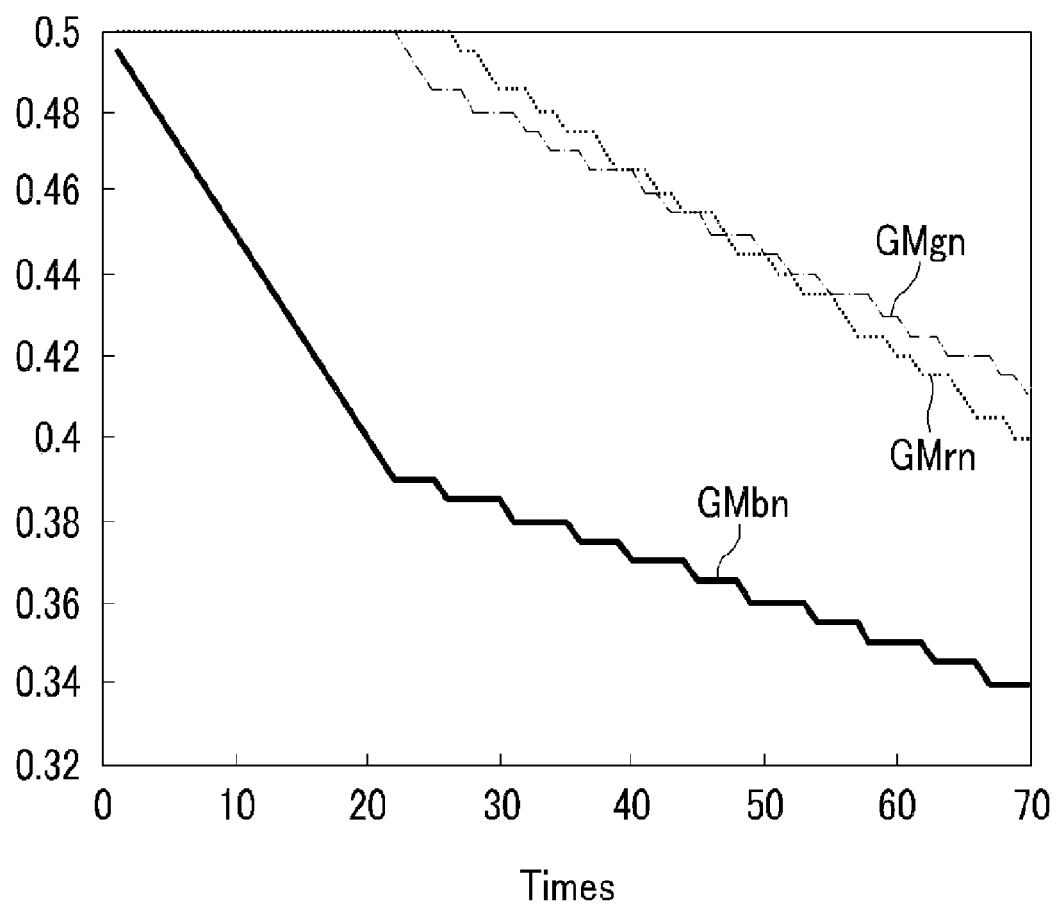
FIG. 7A, FIG. 7B, FIG. 7C, and FIG. 7D are graphs showing correction results with a target color coordinate (xt, yt) of (0.29, 0.30) and a target luminance of 200 cd/m$^2$.
Figure 7B:
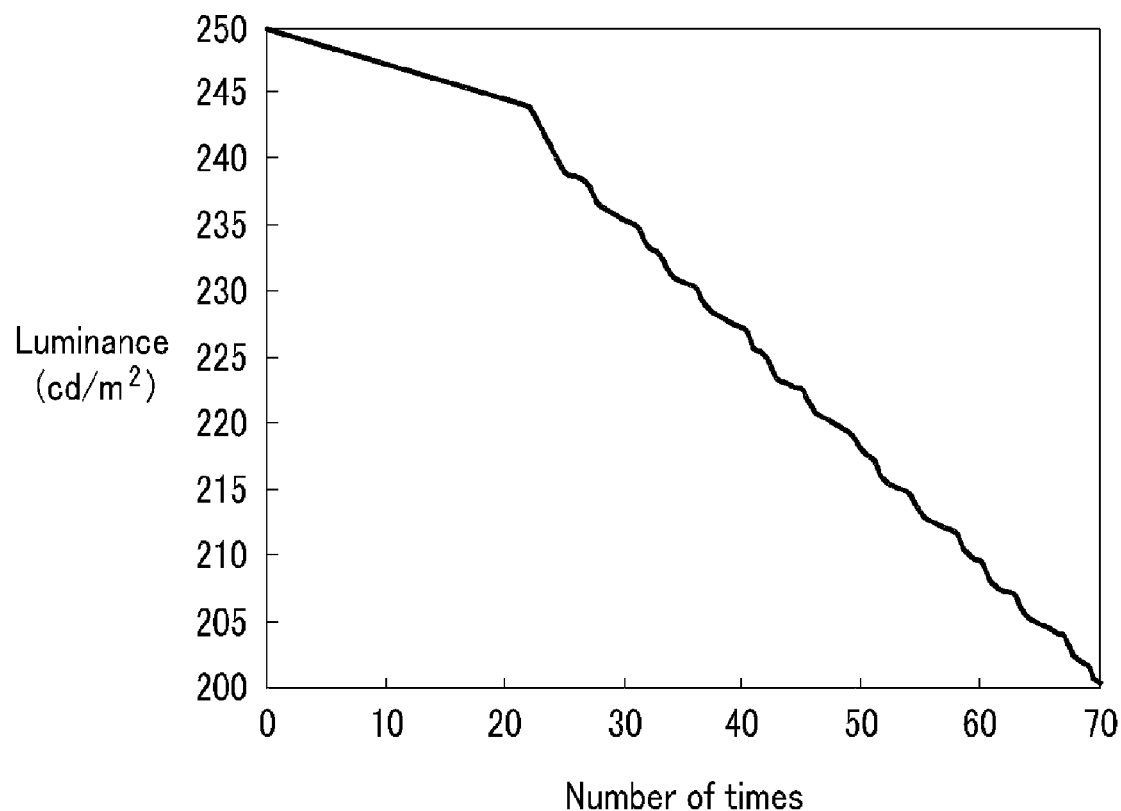
Figure 7C:
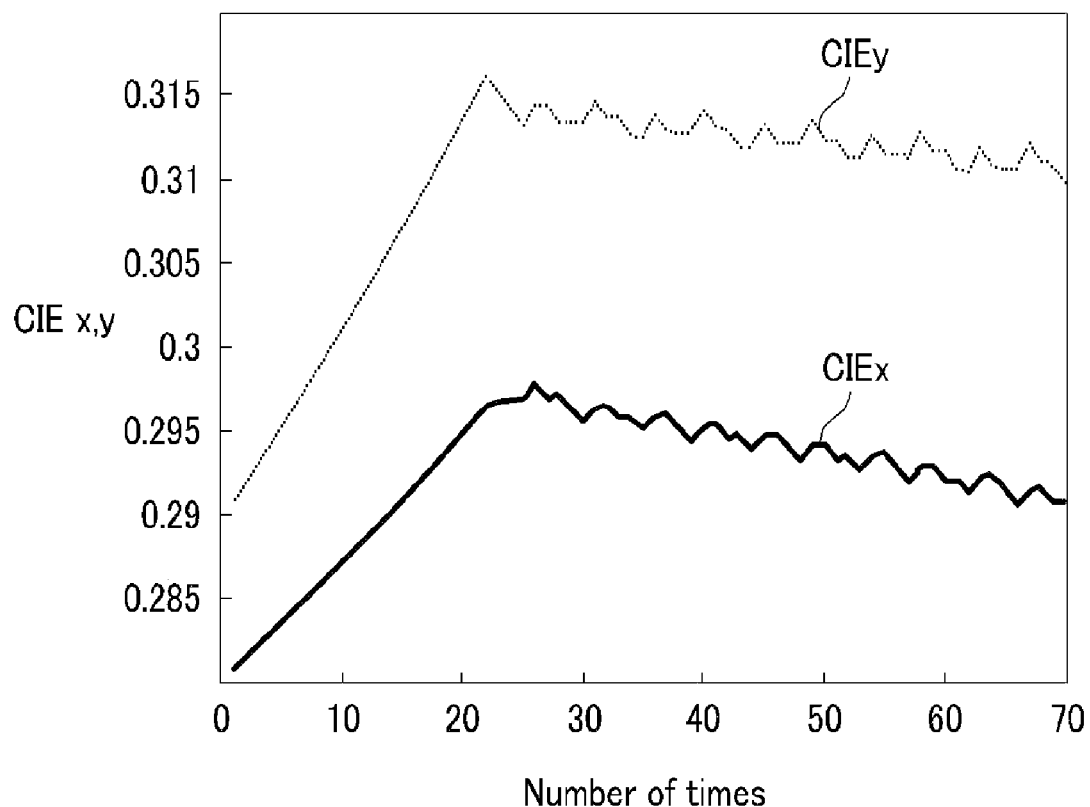
Figure 7D:
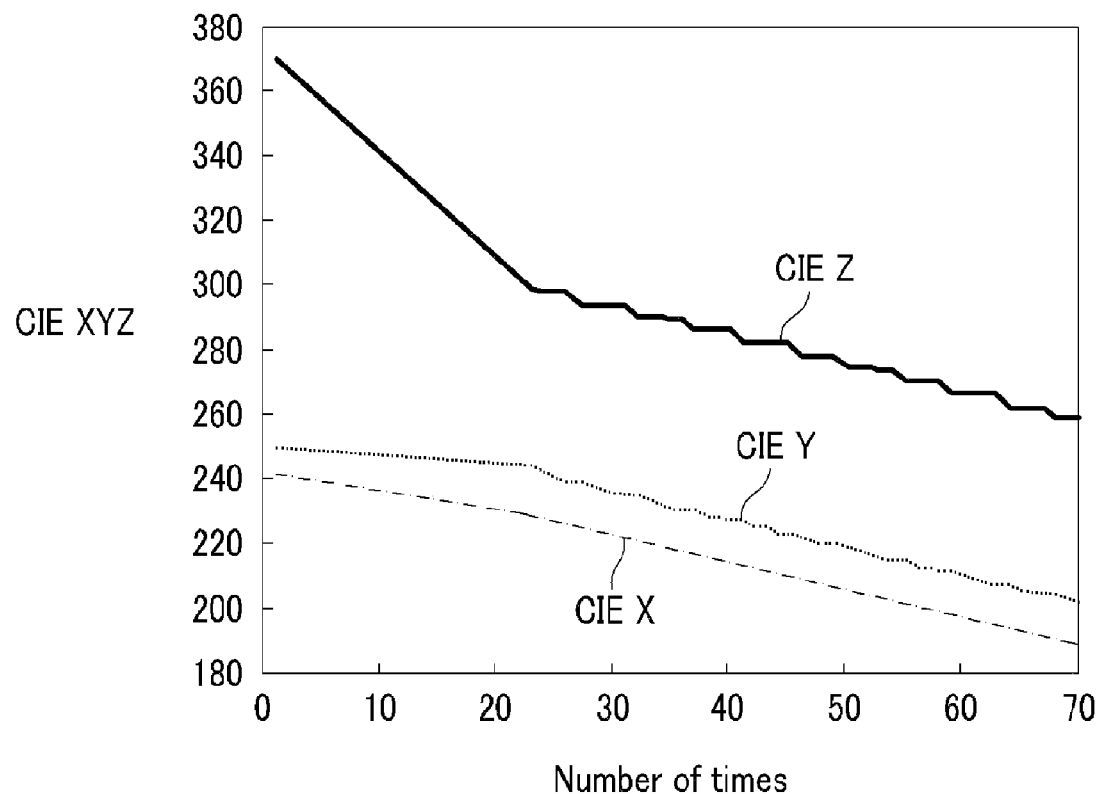

FIG. 4 is a block diagram showing a method of generating gamma data of a display device according to an exemplary embodiment of the present invention, and FIG. 5, FIG. 6A, and FIG. 6B are flowcharts of a method of generating gamma data of a display device according to an exemplary embodiment of the present invention.

The above-described gray voltage generator 800, signal controller 600 and the memory 750 form a controller 700 in FIG. 4.

A system 730 sets up a value of gamma data GM and provides the value of the gamma data GM to the signal controller 600 of the controller 700. Then, the signal controller 600 generates gray voltage control signals CONT31, CONT32, and CONT33, and outputs the generated gray voltage control signals CONT31, CONT32, and CONT33 to the gray voltage generator 800. The gray voltage generator 800 generates reference gray voltages Vrr, Vrg, and Vrb having magnitudes that are determined according to the gray voltage control signals CONT31, CONT32, and CONT33, and provides them to the data driver 500.

Also, the system 730 provides input image signals Rin, Gin, and Bin representing one reference gray n among the reference grays, e.g., 239 gray, to the signal controller 600. The signal controller 600 outputs output image signals Rout, Gout, and Bout corresponding to the input image signals Rin, Gin, and Bin to the data driver 500. The data driver 500 converts the output image signals Rin, Gin, and Bin to data voltages based on the reference gray voltages Vrr, Vrg, and Vrb from the gray voltage generator 800 and applies the data voltages to the data lines $D_1$-$D_m$. The pixels PX receive the data voltages of the data lines $D_1$-$D_m$ through the switching elements Qs and display an image by converting the received data voltages to optical signals.

Hereinafter, a method for correcting the gamma data GM, which is performed in the system 730, will be described with reference to FIG. 5, FIG. 6A, and FIG. 6B.

Referring to FIG. 5, a measured luminance L0 and a measured color coordinate (x0, y0) are obtained by measuring the luminance and the color coordinate of the white image displayed based on the reference gray n using an optic meter 50 (S11). The measured color coordinate (x0, y0) may be a color coordinate of the 1931 chromaticity diagram of the CIE.

Then, the system 730 compares the measured luminance L0 and the measured color coordinate (x0, y0) with a predetermined target luminance Lt and a target color coordinate (xt, yt), respectively, and corrects gamma data GM based on the comparison result.

A difference between the measured color coordinate (x0, y0) and the target color coordinate (xt, yt) and a difference between the measured luminance L0 and the target luminance Lt are calculated, and it is determined whether the measured color coordinate (x0, y0) and the measured luminance L0 are in the target range or not (S12). For example, if the difference of the color coordinates is less than 0.001 and if the difference of the luminances is less than 1%, it may be determined that the measured color coordinate (x0, y0) and the measured luminance L0 are in the target range.

If the measured color coordinate (x0, y0) and the measured luminance L0 are not in the target range, the measured color coordinate (x0, y0) and the measured luminance L0 are converted to a measured coordinate (X0, Y0, Z0) in the CIE XYZ coordinate system. Meanwhile, the target color coordinate (xt, yt) and the target luminance Lt are converted to a target coordinate (Xt, Yt, Zt) in the CIE XYZ coordinate system (S13). Here, Equation 1 may be used as a transforming equation.

$$X = \frac{x}{y}Y, Z = \frac{1-x-y}{y}Y, Y = L \qquad \text{Equation 1}$$

In Equation 1, X, Y, and Z are tristimulus values of the 1931 CIE XYZ color coordinate system (hereinafter CIE XYZ coordinate system). Y corresponds to luminance, X denotes a stimulus value of red, and Z is a stimulus value of blue. L denotes luminance (e.g., L0 and Lt), and x and y denote color coordinates (e.g., x0, xt, y0 and yt) in the CIE 1931 chromaticity diagram.

The converted measured coordinate (X0, Y0, Z0) and the target coordinate (Xt, Yt, Zt) are compared (S14). Step S14 will be described in detail with reference to FIG. 6A and FIG. 6B.

Referring to FIG. 6A, absolute values |Xt-X0|, |Yt-Y0|, and |Zt-Z0| are obtained from the converted measured coordinate (X0, Y0, Z0), which are in the CIE XYZ coordinate system, and the target coordinate (Xt, Yt, Zt) (S21).

The absolute values |Xt-X0|, |Yt-Y0|, and |Zt-Z0| are compared with each other, and the largest absolute value is selected therefrom. Then, the gamma data GM for the reference gray n is corrected to change luminance of a pixel PX that displays a color R, G, and B that most influences the CIE XYZ coordinate having the largest absolute value.

Here, it is assumed that the luminances of red, green, and blue pixels PX are standardized to have values from 0 to 1, and these are referred to as red luminance Lr, green luminance Lg, and blue luminance Lb. X, Y, and Z of the CIE XYZ coordinate system have the following relationships with the red luminance Lr, the green luminance Lg, and the blue luminance Lb.

$$\begin{pmatrix} X \\ Y \\ Z \end{pmatrix} = \begin{pmatrix} RX & GX & BX \\ RY & GY & BY \\ RZ & GZ & BZ \end{pmatrix} \begin{pmatrix} Lr \\ Lg \\ Lb \end{pmatrix} \qquad \text{Equation 2}$$

The above transforming matrix can be obtained from an experiment, and RX, GY, and BZ have the largest value in each row. Equation 3 is an example of the transforming matrix shown.

$$\begin{pmatrix} X \\ Y \\ Z \end{pmatrix} = \begin{pmatrix} 212.49 & 109.2 & 6.23 \\ 153.81 & 336.0 & 77.75 \\ 117.07 & 54.8 & 658.43 \end{pmatrix} \begin{pmatrix} Lr \\ Lg \\ Lb \end{pmatrix} \qquad \text{Equation 3}$$

Therefore, a value of X is most influenced by the red luminance Lr, a value of Y is most influenced by the green luminance Lg, and a value of Z is most influenced by the blue luminance Lb. Therefore, the gamma data GM for each color R, G, and B is corrected so as to change the red luminance Lr of the red pixel if |Xt-X0| is the largest, to change the green luminance Lg of the green pixel if |Yt-Y0| is the largest, and to change the blue luminance Lb of the blue pixel if |Zt-Z0| is the largest.

The correction of the gamma data GM will be described in detail. Hereinafter, the gamma data GM of red color R is referred to as a red gamma data GMrn, the gamma data GM of green color G is referred to as a green gamma data GMgn, and the gamma data GM of blue color B is referred to as a blue gamma data GMbn for a reference gray n.

It is determined whether |Xt-X0| is the greatest among |Xt-X0|, |Yt-Y0|, and |Zt-Z0| (S22). If |Xt-X0| is the greatest among the three values, the value of Xt is compared with the value of X0 (S23).

If the value of Xt is greater than the value of X0, it is determined whether the red gamma data GMrn is the maximum value or not (S24). If the red gamma data GMrn is not the maximum value, the red gamma data GMrn is corrected to be larger in order to increase the red luminance Lr (S26). However, if the red gamma data GMrn is already the maximum value, the green gamma data GMgn or the blue gamma data GMbn is corrected to be smaller in order to reduce the green luminance Lg or the blue luminance Lb (S25). If the red gamma data GMrn is already the maximum value, the target luminance Lt may be reset instead of correcting the green gamma data GMgn or the blue gamma data GMbn because the original target luminance Lt may not be obtainable.

If Xt is not larger than X0, it is determined whether the red gamma data GMrn is the minimum value or not (S27). If the red gamma data GMrn is not the minimum value, the red gamma data GMrn is corrected to be smaller to reduce the value of the red luminance Lr (S29). However, if the red gamma data GMrn is already the minimum value, the green gamma data GMgn or the blue gamma data GMbn is corrected to be larger to increase the value of the green luminance Lg or the blue luminance Lb (S28), or step S28 may be interrupted and the target luminance Lt may be reset.

Referring to FIG. 6B, if it is determined at step (S22) that |Xt-X0| is not the largest among |Xt-X0|, |Yt-Y0|, and |Zt- Z0|, then it is determined and if |Yt-Y0| is the greatest among the three values, the value of Yt is compared with the value of Y0 (S33).

If the value of Yt is larger than the value of Y0, it is determined whether the green gamma data GMgn is the maximum value or not (S34). If the green gamma data GMgn is not the maximum value, the green gamma data GMgn is corrected to be larger to increase a value of green luminance Lg (S36). However, it the green gamma data GMgn is already the maximum value, the red gamma data GMrn or the blue gamma data GMbn is corrected to be smaller in order to reduce red luminance Lr or blue luminance Lb (S35). If the value of the green gamma data GMgn is the maximum, the present process may be interrupted and the target luminance Lt may be reset.

If Yt is not greater than Y0, it is determined whether the value of the green gamma data GMgn is the minimum or not (S37). If the green gamma data GMgn is not the minimum value, the green gamma data GMgn is corrected to be smaller in order to reduce the value of the green luminance Lg (S39). If the green gamma data GMgn is the minimum value, the red gamma data GMrn or the blue gamma data GMbn is corrected to be larger in order to increase the value of the red luminance Lr or the blue luminance Lb (S38), or the target luminance Lt may be reset.

If it is determined at step (S32) that |Yt-Y0| is not the greatest among |Xt-X0|, |Yt-Y0|, and |Zt-Z0|, then the value of Zt is compared with the value of Z0 (S43).

If the value of Zt is greater than the value of Z0, it is determined whether the value of the blue gamma data GMbn is the maximum or not (S44). If the blue gamma data GMbn is not the maximum value, the blue gamma data GMbn is corrected to be larger in order to include the value of the blue luminance Lb (S46). If the blue gamma data GMbn is the maximum, the red gamma data GMrn or the green gamma data GMgn is corrected to be smaller to reduce the value of the red luminance Lr or the value of the green luminance Lg (S45). If the value of the blue gamma data GMbn is the maximum, the process may be interrupted and the target luminance Lt may be reset.

If Zt is not greater than Z0, it is determined whether the value of the blue gamma data GMbn is the minimum or not (S47). If the blue gamma data GMbn is not the minimum, the blue gamma data GMbn is corrected to be smaller in order to reduce the value of the blue luminance Lb (S49). If the blue gamma data GMbn is the minimum value, the red gamma data GMrn or the green gamma data GMgn may be corrected to be larger in order to increase the value of the red luminance Lr or the value of the green luminance Lg (S48), or the target luminance Lt may be reset.

If it is determined that |Xt-X0|, |Yt-Y0| and |Zt-Z0| are the same as each other, any value among |Xt-X0|, |Yt-Y0| and |Zt-Z0| may be assumed to be the greatest and the corresponding steps described above may be taken.

As described above, the gamma data GM is corrected as determined in the system 730 to change the red, green, or blue luminance Lr, Lg, or Lb, and the corrected gamma data GM is input to the gray voltage generator 800 in the form of gray voltage control signals CONT31, CONT32, and CONT33 through the signal controller 600. Then, referring to FIG. 5, the gray voltage generator 800 changes the magnitudes of the red, green, and blue reference gray voltages Vrr, Vrg, and Vrb of the reference gray n according to the gray voltage control signals CONT31, CONT32, and CONT33 (S15). Data voltages of red, green, and blue colors for the reference gray n are changed (S16), and a corresponding image is displayed on the display panel 400 (S17).

The above process are repeated until the measured color coordinate (x0, y0) and the measured luminance L0 for a specific reference gray n converges to the target color coordinate (xt, yt) and the target luminance Lt (the loop of FIG. 5).

If the correcting operation for one reference gray n is finished as described above, the system 730 provides input image signals Rin, Gin, and Bin of another reference gray, e.g., n+1 or n−1, to the signal controller 600. Then, the above-described process is repeated. If such a correcting process is completely finished, corrected gamma data GM for all of the reference grays, e.g., 9 reference grays, is obtained. However, since the 0 gray is already determined in Table 1, a correcting operation for that gray is not performed. The finally obtained gamma data GM is stored in the memory 750.

FIG. 7A, FIG. 7B, FIG. 7C, and FIG. 7D are graphs showing correction results when the target color coordinate (xt, yt) is (0.29, 0.30) and the target luminance Lt is 200 cd/m$^2$. When the standardized values of the initial red, green, and blue gamma data GMrn, GMgn, and GMbn are 0.5, 0.5, and 0.5, the initial measured luminance L0 is 250 cd/m$^2$ and the initial measured color coordinate (x0, y0) is (0.2808, 0.2908). Here, the standardized values are obtained by standardizing red, green, and blue gamma data to have a value from 0 to 1. When the standardized red, green, and blue gamma data GMrn, GMgn, and GMbn are 0.4, 0.41, and 0.34 as a result of repeating the above-described process 70 times, a color coordinate (0.2907, 0.3096) and luminance of 200.072 cd/m$^2$, which almost converge to the target color coordinate (0.29, 0.30) and the target luminance of 200 cd/m$^2$, were obtained.

A gamma data generation method of a display device according to another exemplary embodiment of the present invention will be described in detail with reference to FIG. 4, FIG. 8, FIG. 9, and FIG. 10.

Figure 8:
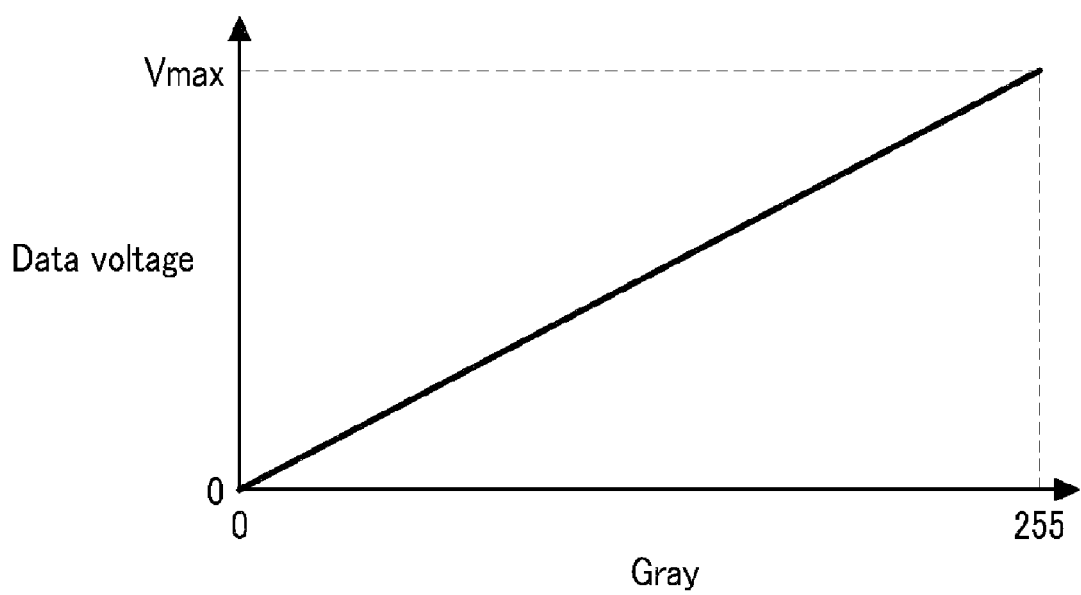
FIG. 8 is a graph showing a relationship between an input gray and a data voltage in a method of generating gamma data of a display device according to another exemplary embodiment of the present invention.
Figure 9:
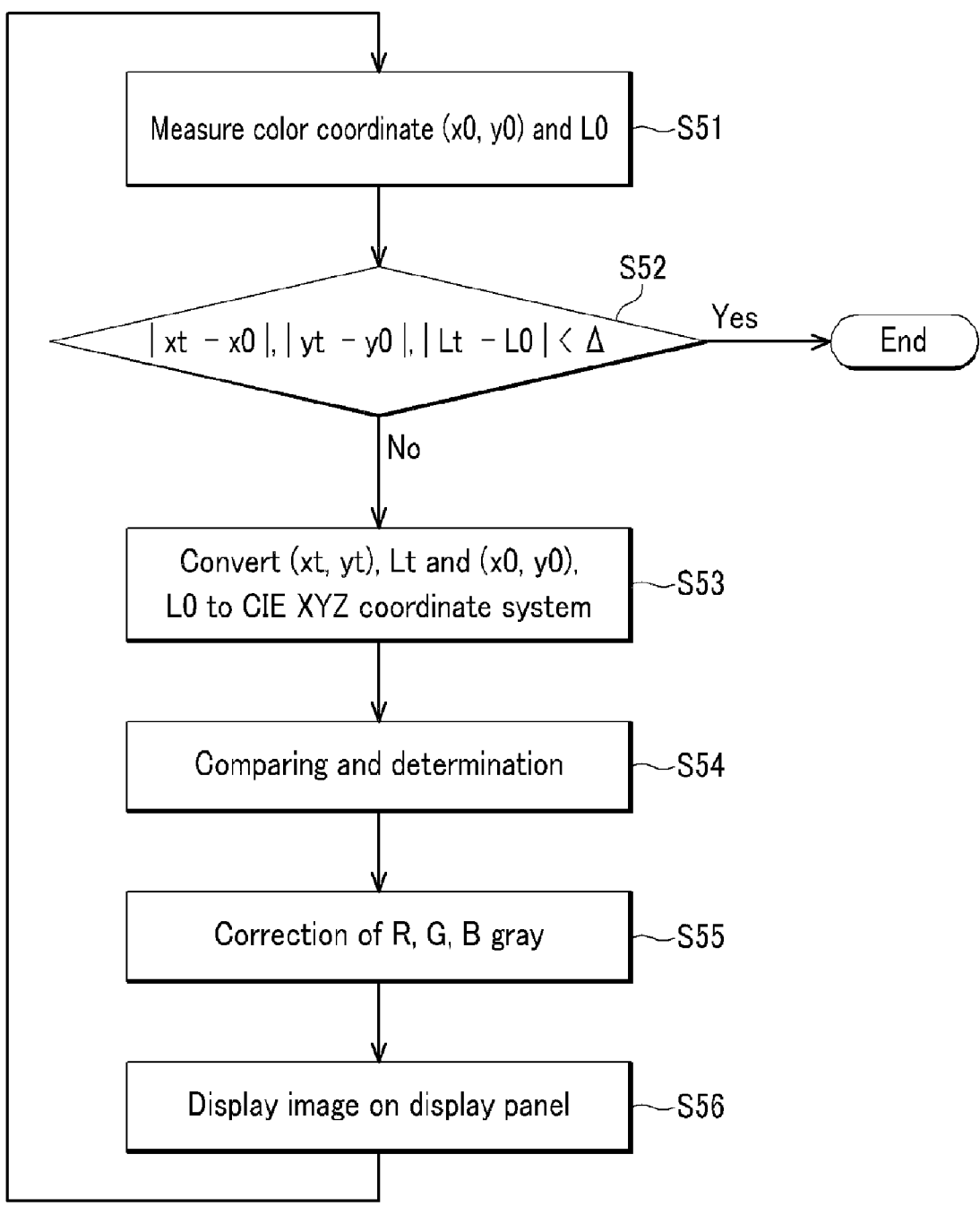
FIG. 9 is a flowchart showing a method for generating gamma data of a display device according to another exemplary embodiment of the present invention.
Figure 10:
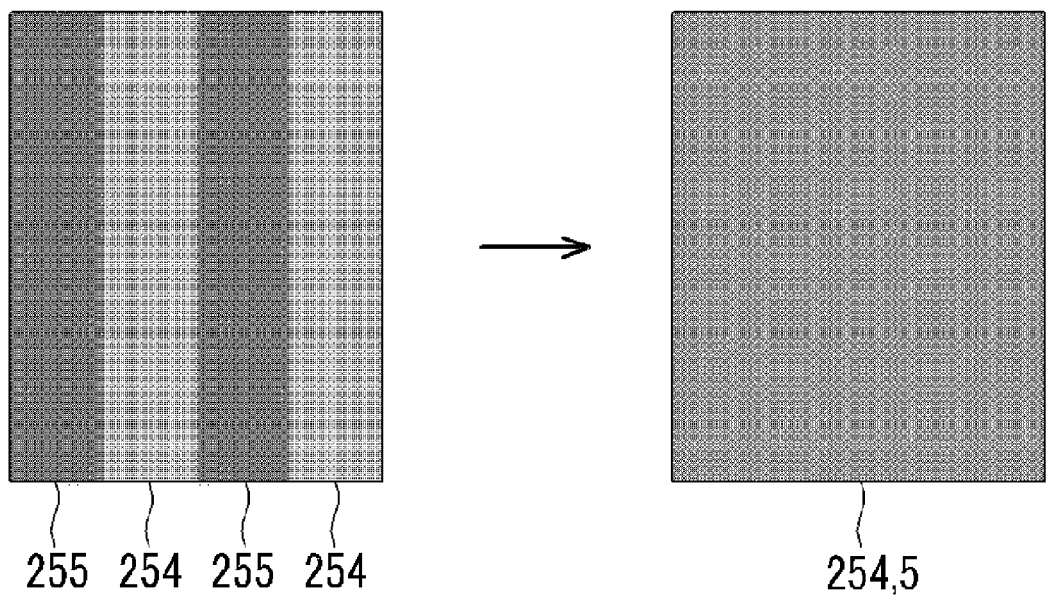
FIG. 10 shows a dithering pattern for displaying an intermediate gray when the bit number of a gamma data is 2 bits larger than the bit number of an input image signal.

FIG. 8 is a graph showing a relationship between an input gray and a data voltage in a method of generating gamma data of a display device according to another exemplary embodiment of the present invention, and FIG. 9 is a flowchart showing a method of generating gamma data of a display device according to another exemplary embodiment of the present invention. FIG. 10 shows a dithering pattern for displaying an intermediate gray when the bit number of a gamma data is 2 bits larger than the bit number of an input image signal.

Unlike the previous exemplary embodiment, an appropriate value of the gamma data GM is obtained by changing input image signals Rin, Gin, and Bin in the present exemplary embodiment instead of obtaining an appropriate value by directly changing the gamma data GM for each color R, G, and B.

First, the system 730 sets up gray voltages to make relationships of data voltages and grays of input image signals Rin, Gin, and Bin, that is, input grays, to be linear, and provides an initial gamma data GM to the signal controller 600.

Referring to FIG. 9, the gamma data generation method of the present exemplary embodiment is almost similar to that of the previous exemplary embodiment.

First, the system 730 provides input image signals Rin, Gin, and Bin for one reference gray n among the 9 reference grays for red (R), green (G), and blue (B) colors, e.g., 239 grays, to the signal controller 600, and the signal controller 600 outputs corresponding output image signals Rout, Gout, and Bout to the data driver 500. The data driver 500 divides the reference gray voltages Vrr, Vrg, and Vrb from the gray voltage generator 800, selects data voltages corresponding to the output image signals Rout, Gout, and Bout, and applies the selected data voltages to the pixel PX, thereby displaying an image.

Then, the luminance L0 and the color coordinate (x0, y0) of a white image displayed for a reference gray n are measured using an optic meter 50 (S51).

It is determined whether the measured color coordinate (x0, y0) and the luminance L0 are in a target range or not by comparing the measured color coordinate (x0, y0) and luminance L0 with a target luminance Lt and a target color coordinate (xt, yt), which are previously set up by the system 730 (S52).

If the measured color coordinate (x0, y0) and luminance L0 are not in the target range, the measured color coordinate (x0, y0), the target color coordinate (xt, yt), the measured luminance L0, and the target luminance Lt are converted to the CIY XYZ coordinate system (S53).

Then, the converted XYZ coordinate values are compared and determined (S54) like in the method according to the previous exemplary embodiment shown in FIG. 6A and FIG. 6B. In step S54, |Xt-X0|, |Yt-Y0|, and |Zt-Z0| are compared with each other.

Unlike the method according to the previous exemplary embodiment shown in FIG. 5, gray values of the input image signals Rin, Gin, and Bin are changed according to the determinations of how to change the intensity of the red, green, or blue measured luminance Lr, Lg, and Lb (S55) in the system 730, instead of correcting the gamma data GM.

In order to express a high gray based on 10 bits or over to be applied to the gamma data GM having a bit number of more than 10, a dithering method is used as shown in FIG. 9 since the bit number of each color R, G, and B of the input image signals Rin, Gin, and Bin is 8 bits when the number of grays is 256. As shown in FIG. 10, grays of 254.5 can be virtually displayed by alternately displaying grays of 255 and 254. Unlike FIG. 5, two grays can be alternately displayed in a vertical direction or the two grays can be alternately displayed in the vertical direction and the horizontal direction. Also, a desired gray can be displayed by a temporal average of different grays alternately displayed for several frames.

Referring to Table 1, the initial gamma data GM is corrected based on the grays of input image signals Rin, Gin, and Bin that are obtained by repeating the above-described process for 8 grays, but not the 0 gray. Finally, the corrected gamma data GM is stored in the memory 750.

If the grays of the image signals Rin, Gin, and Bin are directly changed so that the measured color coordinate and measured luminance may converge to a target color coordinate (xt, yt) and a target luminance Lt as described above, the measured color coordinate and the measured luminance may converge to the target color coordinate (xt, yt) and the target luminance Lt faster without changing the reference gray voltages Vrr, Vrg, and Vrb output from the gray voltage generator 800 according to the correction of the gamma data GM every time.

Figure 11A:
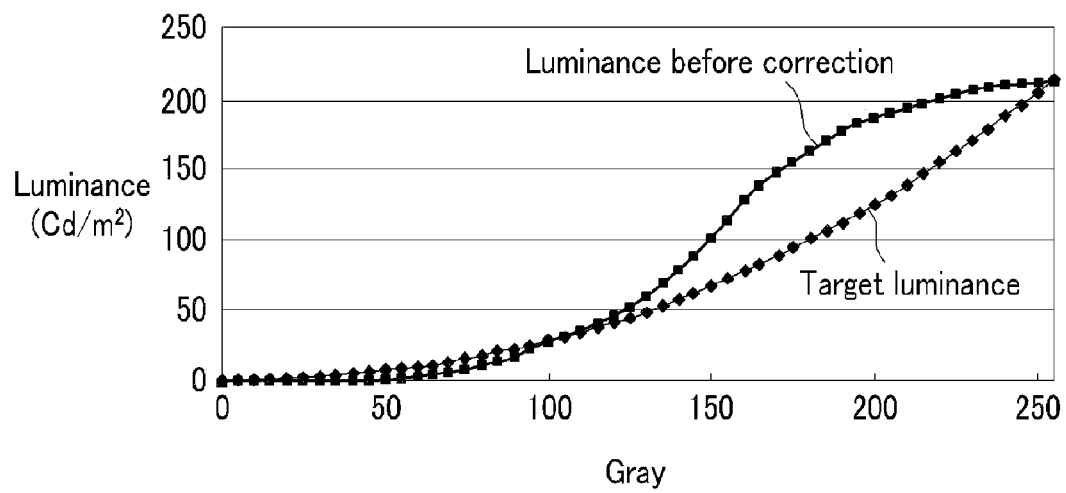
FIG. 11A and FIG. 11B are graphs respectively showing luminance and color coordinates of a display device before correction.
Figure 11B:
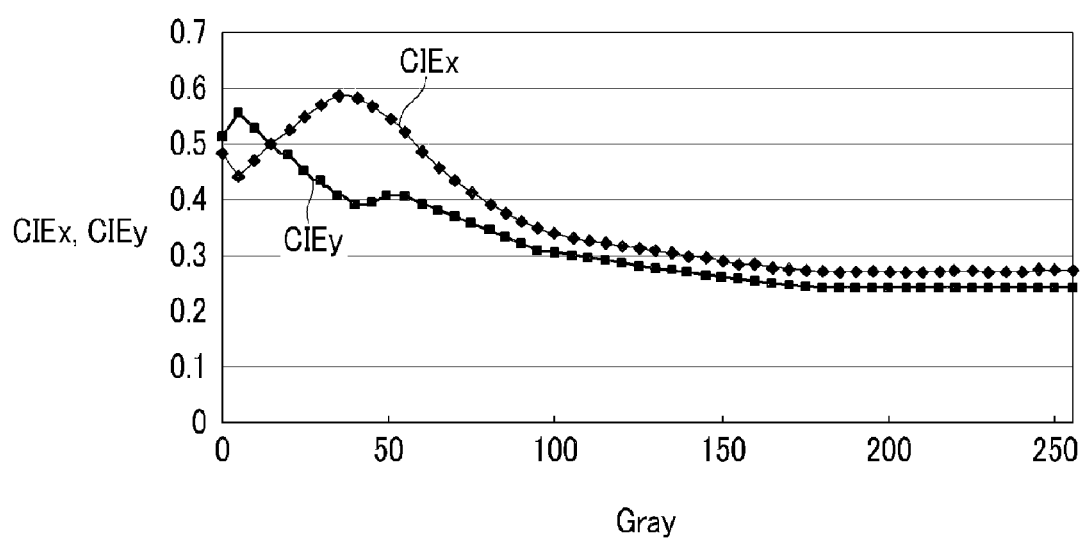
Figure 11C:
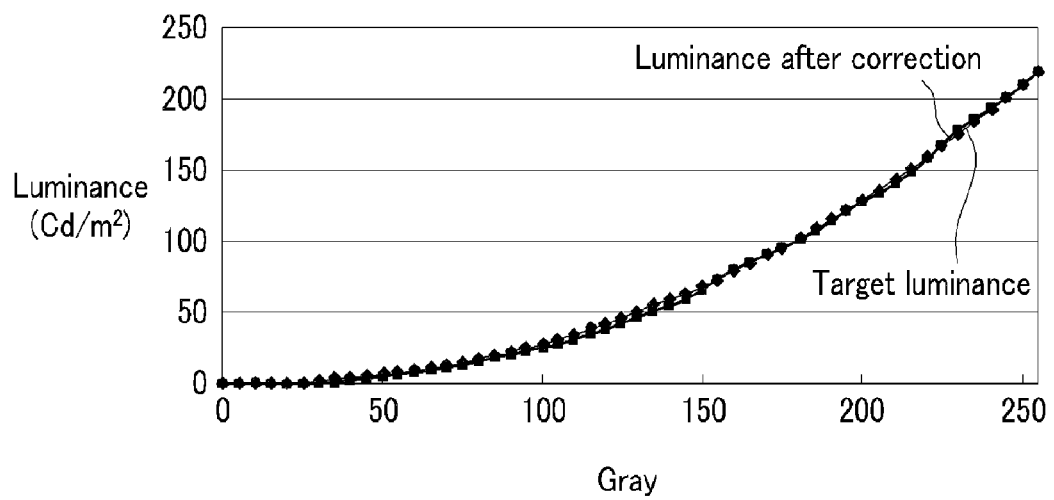
FIG. 11C and FIG. 11D are graphs respectively showing luminance and color coordinates of a display device after correction according to an exemplary embodiment of the present invention.
Figure 11D:
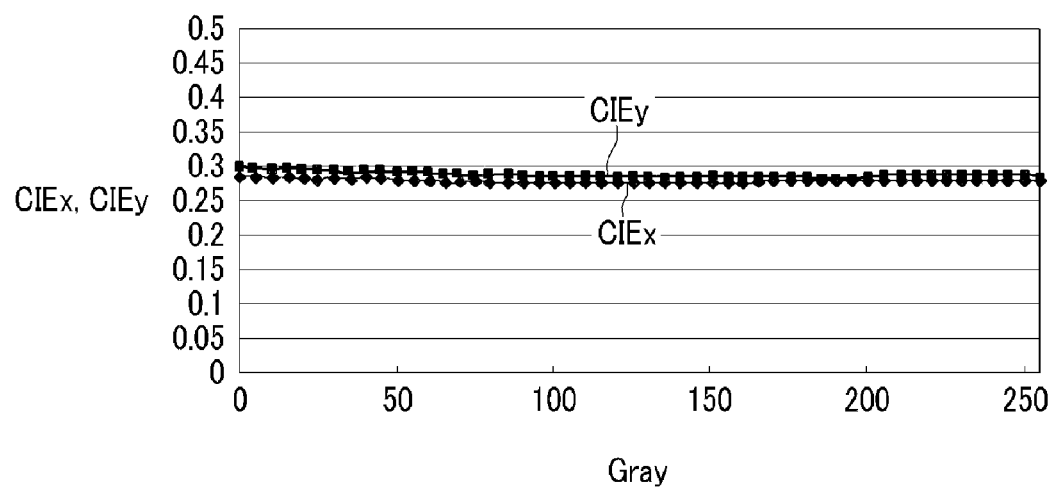

FIG. 11A and FIG. 11B are graphs respectively showing luminance and color coordinates of a display device before correction, and FIG. 11C and FIG. 11D are graphs respectively showing the luminance and color coordinates of a display device after correction according to an exemplary embodiment of the present invention.

As shown in FIG. 11A, FIG. 11B, FIG. 11C, and FIG. 11D, gamma data GM can be generated to have target luminance Lt in all grays and to sustain uniform color coordinates at the same time by using the gamma data generation method of a display device according to an exemplary embodiment of the present invention.

According to the exemplary embodiments of the present invention, the gamma data GM may be corrected so that the luminance and color coordinates for reference grays may converge to a target luminance and target coordinates simultaneously and quickly without dualizing the luminance and the color coordinates. Particularly, the gamma generation method according to exemplary embodiments of the present invention is essential to a display device, such as an organic light emitting device, that includes thin film transistors having characteristics that are easily varied according to red, green, and blue pixels and is current-based driven.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A gamma data generation method of a display device, comprising:
    determining gamma data comprising red gamma data, green gamma data, and blue gamma data;
    determining a target luminance and a target color coordinate of a first reference gray;
    displaying an image on a display device based on a red input image signal, a green input image signal, and a blue input image signal for a first reference gray;
    measuring a first luminance and a first color coordinate from the image;
    determining whether a coordinate difference between the first color coordinate and the target color coordinate and a luminance difference between the first luminance and the target luminance are in an allowable error range or not;
    converting the first luminance and the first color coordinate to a first coordinate of a CIE XYZ coordinate system, and converting the target luminance and the target color coordinate to a target coordinate of the CIE XYZ coordinate system if the coordinate difference and the luminance difference are not in the allowable error range; and
    determining to change a red luminance, a green luminance, or a blue luminance of the image according to a comparison of the first coordinate of the CIE XYZ coordinate system with the target coordinate of the CIE XYZ coordinate system.

2. The gamma data generation method of claim 1, wherein the comparison of the first coordinate of the CIE XYZ coordinate system with the target coordinate of the CIE XYZ coordinate system comprises:
    calculating |Xt-X1|, |Yt-Y1|, and |Zt-Z1| from the first coordinate and the target coordinate where (Xt, Yt, Zt) is the target coordinate and (X1, Y1, Z1) is the first coordinate;
    determining a maximum absolute value among |Xt-X1|, |Yt-Y1|, and |Zt-Z1|; and
    determining to change one among the red luminance, the green luminance, and the blue luminance that most influences the maximum absolute value.

3. The gamma data generation method of claim 2, wherein when the maximum absolute value is |Xt-X1|, the determining to change the red luminance, the green luminance, or the blue luminance comprises:
    increasing the red gamma data value, if Xt>X1 and the red gamma data value is not maximum;

reducing the green gamma data value or the blue gamma data value, or resetting the target luminance, if Xt>X1 and the red gamma data value is maximum;

reducing the red gamma data value, if Xt<X1 and the red gamma data value is not minimum; and increasing the green gamma data value or the blue gamma data value, or resetting the target luminance, if Xt<X1 and the red gamma data value is minimum.

4. The gamma data generation method of claim 2, wherein when the maximum absolute value is |Yt-Y1|, the determining to change the red luminance, the green luminance, or the blue luminance further comprises:

increasing the green gamma data value, if Yt>Y1 and the green gamma data value is not maximum;

decreasing the red gamma data value or the blue gamma data value, or resetting the target luminance, if Yt>Y1 and the green gamma data value is maximum;

decreasing the green gamma data value, if Yt<Y1 and the green gamma data value is not minimum; and increasing the red gamma data value or the blue gamma data value, or resetting the target luminance, if Yt<Y1 and the green gamma data value is minimum.

5. The gamma data generation method of claim 2, wherein when the maximum absolute value is |Zt-Z1|, the determining to change the red luminance, the green luminance, or the blue luminance comprises:

increasing the blue gamma data value, if Zt>Z1 and the blue gamma data value is not maximum;

decreasing the green gamma data value or the red gamma data value, or resetting the target luminance, if Zt>Z1 and the blue gamma data value is maximum;

decreasing the blue gamma data value, if Zt<Z1 and the blue gamma data value is not minimum; and increasing the green gamma data value or the red gamma data value, or resetting the target luminance, if Zt<Z1 and the blue gamma data value is minimum.

6. The gamma data generation method of claim 1, wherein the first luminance, the first color coordinate, the target luminance, and the target color coordinate are converted to the CIE XYZ coordinate system according to $$X = \frac{x}{y}Y, Z = \frac{1-x-y}{y}Y, Y = \text{luminance}$$

wherein,

X is a stimulus value of red of the CIE XYZ coordinate system,

Z is a stimulus value of blue of the CIE XYZ coordinate system, and x and y are color coordinates in the CIE 1931 chromaticity diagram.

7. The gamma data generation method of claim 1, further comprising:

correcting the red gamma data, the green gamma data, or the blue gamma data based on the comparison of the first coordinate of the CIE XYZ coordinate system with the target coordinate of the CIE XYZ coordinate system.

8. The gamma data generation method of claim 1, further comprising changing the red input image signal, the green input image signal, or the blue input image signal based on the comparison of the first coordinate of the CIE XYZ coordinate system with the target coordinate of the CIE XYZ coordinate system.

9. The gamma data generation method of claim 8, wherein relationships between a red data voltage and a gray of the red input image signal, between a green data voltage and a gray of the green input image signal, and between a blue data voltage and a gray of the blue input image signal are linear.

10. The gamma data generation method of claim 8, wherein changing of the red input image signal, the green input image signal, or the blue input image signal comprises a dithering method.

11. A gamma data generating system of a display device, comprising:

a gamma set up unit to set up a red gamma data, a green gamma data, and a blue gamma data;

a target setup unit to set up a target luminance and a target color coordinate of a first reference gray;

a measuring unit to measure a first luminance and a first color coordinate from an image of the first reference gray;

an error determining unit to determine whether a coordinate difference between the first color coordinate and the target color coordinate and a luminance difference between the first luminance and the target luminance are in an allowable error range or not;

a converter to convert the first luminance and the first color coordinate to a first coordinate of a CIE XYZ coordinate system, and to convert the target luminance and the target color coordinate to a target coordinate of the CIE XYZ coordinate system if the coordinate difference and the luminance difference are not in the allowable error range; and a comparator to change a red luminance, a green luminance, or a blue luminance of the image according to a comparison of the first coordinate of the CIE XYZ coordinate system with the target coordinate of the CIE XYZ coordinate system.

* * * * *